Oct. 29, 1968 H. H. LORENZ 3,407,906
BRAKE LINING WEAR SIGNALLING DEVICE
Filed April 12, 1967

INVENTOR.
Harold H. Lorenz
BY
C. L. Engle
ATTORNEY

United States Patent Office 3,407,906
Patented Oct. 29, 1968

3,407,906
BRAKE LINING WEAR SIGNALLING DEVICE
Harald Horst Lorenz, Bloomfield Hills, Mich., assignor to General Motors Corporation, Detroit, Mich., a corporation of Delaware
Filed Apr. 12, 1967, Ser. No. 630,248
8 Claims. (Cl. 188—1)

ABSTRACT OF THE DISCLOSURE

This disclosure concerns a brake lining wear signalling device incorporating a lever pivotally mounted on a brake shoe which is retained in an inoperative position by an erodible pin responsive to brake lining wear. The lever is spring biased toward an operative position where it is engaged by a striker fixed to the wheel drum when the erodible pin releases the lever to such position. A clapper member is associated with the lever and is caused to strike the brake shoe when the lever is intermittently engaged by the striker to thereby provide an audible signal when a sufficient amount of brake lining wear has occurred.

---

The purpose of this invention is to provide a brake lining wear signalling device that is capable of being readily attached to a conventional brake shoe and wheel drum assembly while including a minimum number of moving parts. More specifically, a lever is pivotally mounted upon the web of a brake shoe and is retained against the force of a biasing spring by an erodible pin embedded within the lining. When a predetermined amount of brake lining wear occurs the pin releases the lever so that the spring biases it into an operative position to be intermittently engaged by a striker attached to the wheel drum. When the striker engages the lever a clapper member associated with the lever is caused to in turn strike the brake shoe and provide an audible signal.

Accordingly, among the objects of this invention is the provision of a relatively simple mechanical structure that can be attached to a conventional brake shoe to provide a signal upon the occurrence of a sufficient amount of brake lining wear.

Another object of this invention is the provision of a mechanical brake lining wear signalling device which can be positioned to be responsive to the area of the brake lining where the most severe wear normally occurs.

A further object of this invention is the provision of a striker actuated lever that is biased to an operative position by a spring member which also acts as the clapper or noise producing member.

Still a further object of this invention includes the provision of an erodible member to retain a clapper actuating lever in an inoperative position until the occurrence of a predetermined amount of brake lining wear.

Further objects and advantages of this invention will be apparent from the following description of the drawings in which.

Figure 1:
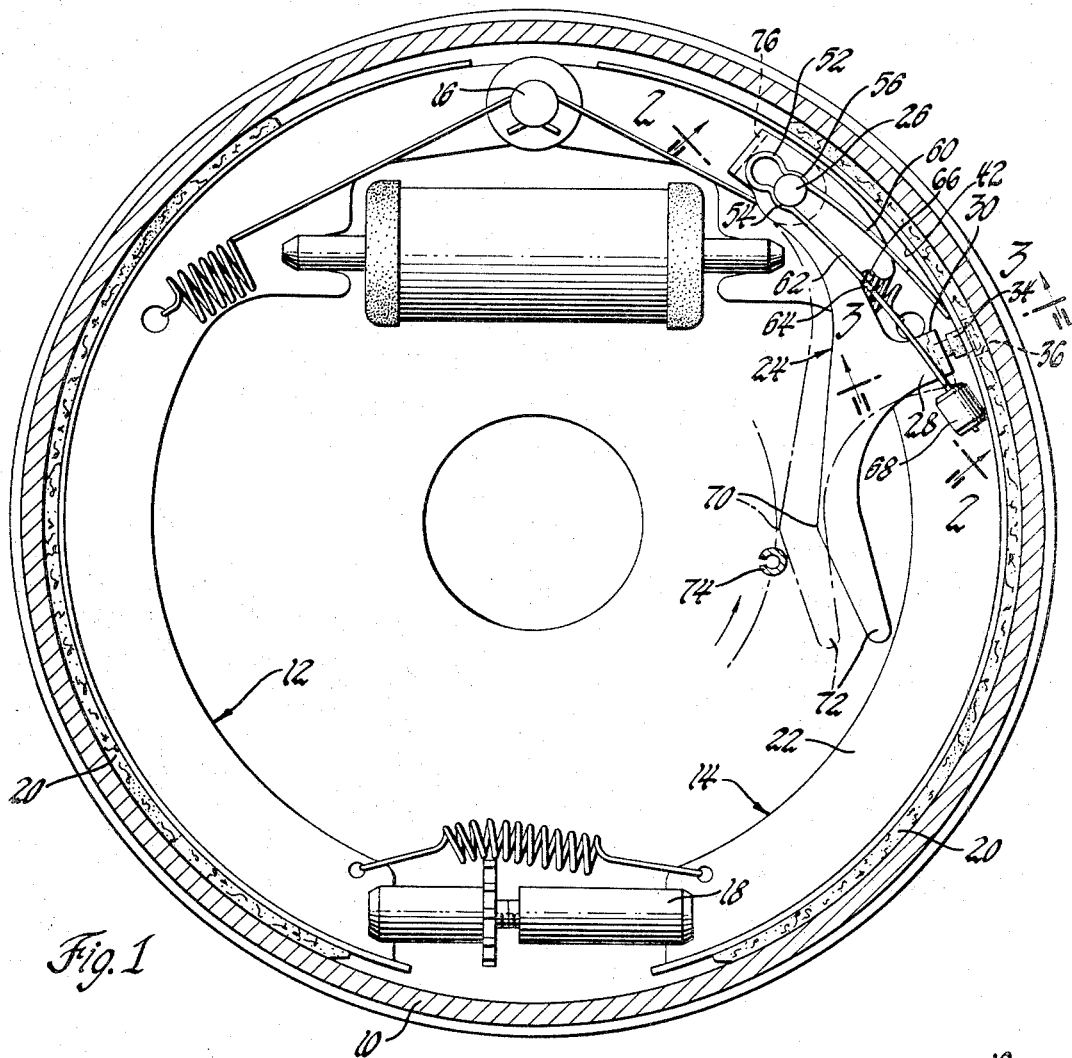
FIGURE 1 is a view partly in section and partly in elevation of a wheel drum assembly showing the elements of this invention in assembled relationship.
Figure 3:
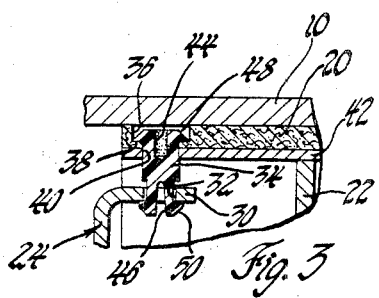
FIGURE 3 is a partial sectional view taken on lines 3—3 of FIGURE 1.

Referring now to FIGURE 1 a wheel brake assembly is depicted comprising a drum 10 containing brake shoes 12 and 14 pivotally secured to an anchor pin 16 at one end and connected by an automatic adjusting mechanism 18 at their other ends. The brake shoes 12 and 14 have linings 20 secured to their outer surfaces for engagement with the inner periphery of drum 10. The brake shoe 14 includes a web 22 which has a lever 24 pivotally secured near the upper shoe end by a pin 26. The lever 24 includes a laterally extending portion 28 which terminates in an axially extending flange 30 having an aperture 32 to receive a trigger pin 34, as best illustrated in FIGURE 3. The brake lining 20 contains a counter bore 36 which terminates in a shoulder 38 that has a second bore 40 axially aligned with counter bore 36 and extending through the lining and through the lining mounting portion 42 of the brake shoe 14. The trigger pin 34 comprises hollow end portions 44 and 46 which are swaged as indicated at 48 and 50 to retain the pin within the lining bore 36 and aperture 32 in the lever 24.

Figure 2:
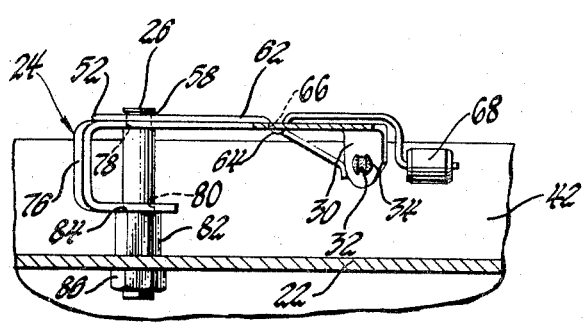
FIGURE 2 is a partial cross sectional view taken on lines 2—2 of FIGURE 1.

A hairpin-shaped spring 52 has arcuate portions 54 and 56 which are tightly fitted within a groove 58 adjacent one end of pin 26. The spring 52 includes legs 60 and 62 and is positioned upon the pin 26 such that leg 60 contacts the lining mounting portion 42 of brake shoe 14 while the leg 62 comprises a laterally extending section 64 that is received within a notch 66 in lever 24. The leg 62 also carries a clapper member 68 upon its outer end. The lever 24 is shaped to have a cam engaging surface terminating in cam surface 70 near its free end 72. As shown in FIGURE 2, the pivotally mounted end of lever 24 terminates in a U-shaped portion 76 through which aligned apertures 78 and 80 rotatably receive pin 26. The pin 26 includes an enlarged portion 82 that provides a bearing surface 84 for the lever and is secured to shoe web 22 by nut 86. The assembly also includes a striker member 74 which is rigidly secured to wheel drum 10, as shown in FIGURE 1.

In operation, and with little or no brake lining wear having occurred, the trigger pin 34 retains lever 24 in the solid line position illustrated in FIGURE 1 such that striker 74 rotates past cam surface 70 without engagement thereof. A predetermined amount of brake lining wear results in end 44 of the trigger pin 34 being worn away as it comes into engagement with the inner periphery of the wheel drum whereby the axial flange 30 of the lever 24 is released allowing spring 52 to bias the lever clockwise about pin 26 to the position indicated by the broken lines in FIGURE 1. This clockwise movement of lever 24 by spring 52 is limited by the engagement of U-shaped portion 76 with the brake shoe lining mounting portion 42. With the lever 24 in this position the striker 74 intermittently engages cam surface 70 during each revolution of wheel drum 10 to rotate the lever in a counter clockwise direction about mounting pin 26. During each engagement the laterally extending portion 64 of spring leg 62 moves with the lever in notch 66 and the clapper 68 is rapidly brought into contact with the lining mounting portion 42 to provide an audible signal. Spring 52 then biases the lever 24 in a clockwise direction about pin 26 to the extended position so that it again will be engaged during the next revolution of wheel drum 10.

When the installation of new brake linings 20 is required, a new trigger pin 34 is merely inserted within the aligned bores 36 and 40 of the shoe assembly and aperture 32 in the lever member so that the signalling mechanism is again placed in an inoperative position until such time as the brake linings become worn.

The above description of a preferred embodiment of this invention is included for purposes of illustration only and is not intended to be limited except as required by the following appended claims.

I claim:
1. A brake lining wear signalling device for a wheel brake assembly having a drum and a brake shoe with a brake lining engageable therewith, comprising a lever pivotally secured to the brake shoe, means biasing said lever toward an operative position, striker means attached to the drum, trigger means carried by the brake shoe and engageable with the lever for normally retaining said lever in an inoperative position and responsive to brake lining wear, and a clapper member carried by said lever whereby sufficient brake lining wear causes said trigger means to release said lever and permit said biasing means to move it to the operative position so that said striker intermittently engages said lever as the wheel drum rotates causing said clapper member to strike the brake shoe and provide an audible signal.

2. The device as described in claim 1 wherein said trigger means comprises an erodible pin of soft material embedded in the brake lining at the point of most wear.

3. The device as described in claim 1 wherein said lever biasing means comprises a hairpin-shaped spring having one leg in engagement with the brake shoe and the other leg in engagement with the lever to bias it toward an operative position.

4. A device as described in claim 1 wherein said lever comprises a lateral portion having an axially extending flange normally engaged and retained by said trigger means to hold said lever in the inoperative position.

5. A device as described in claim 1 wherein said lever includes a cam surface engageable by said striker.

6. A device as described in claim 3 wherein one leg of said hairpin spring includes a laterally extending portion which engages said lever.

7. A device as described in claim 3 wherein one leg of said spring has said clapper member secured thereto.

8. A device as described in claim 6 wherein said spring lateral portion engages a notch in said lever.

References Cited

UNITED STATES PATENTS

| 3,199,631 | 8/1965 | Blankemeyer | 188—1 |
| 3,320,921 | 5/1967 | Wolf et al. | 188—1 X |

DUANE A. REGER, *Primary Examiner.*